Figure 1:
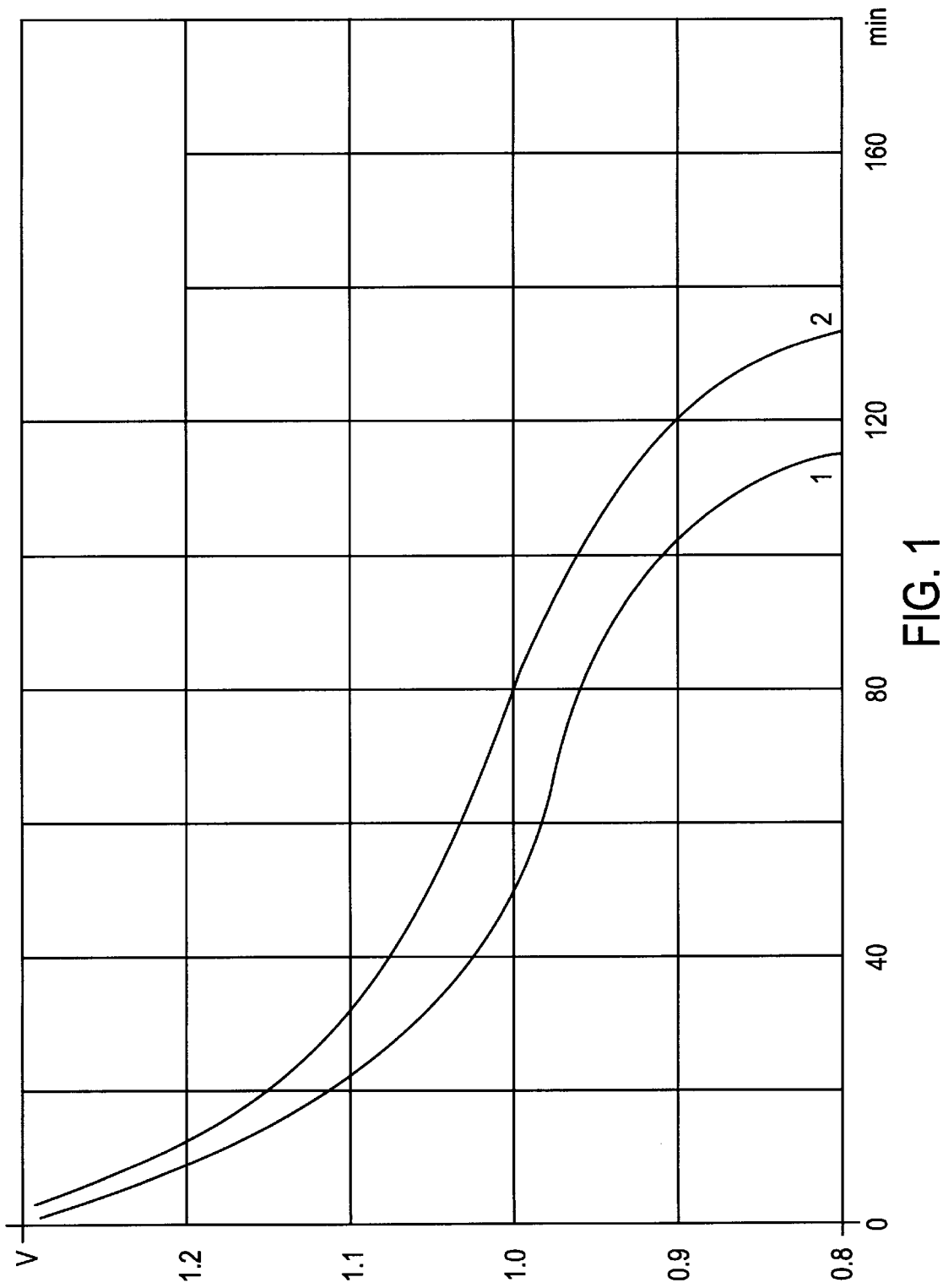

United States Patent
Goldstein et al.

[11] Patent Number: 6,015,636
[45] Date of Patent: Jan. 18, 2000

[54] ENHANCED PERFORMANCE ZINC

[75] Inventors: Jonathan Goldstein, Jerusalem; Menachem Givon, Hanegev; Yuli Zingerman, Beit Shemesh, all of Israel

[73] Assignee: Electric Fuel Ltd., Jerusalem, Israel

[21] Appl. No.: 09/088,541

[22] Filed: Jun. 1, 1998

[51] Int. Cl.[7] ........................................ H01M 4/42
[52] U.S. Cl. ........................................ 429/229; 29/623.1
[58] Field of Search ............................ 429/229; 29/623.1

[56]  References Cited

U.S. PATENT DOCUMENTS

| | | |
|---|---|---|
| 3,198,668 | 8/1965 | Schneider . |
| 3,348,976 | 10/1967 | Kelly et al. . |
| 4,579,791 | 4/1986 | Wang ........................... 429/50 |
| 5,419,987 | 5/1995 | Goldstein et al. ............ 429/229 |
| 5,516,599 | 5/1996 | Korall et al. .................. 429/48 |

FOREIGN PATENT DOCUMENTS

| | | | |
|---|---|---|---|
| 57-182972 | 11/1982 | Japan | H01M 4/42 |
| 7-254406 | 10/1995 | Japan | H01M 4/06 |

*Primary Examiner*—Maria Nuzzolillo
*Assistant Examiner*—Carol Chaney
*Attorney, Agent, or Firm*—Helfgott & Karas, P C.

[57] ABSTRACT

The invention provides enhanced performance zinc for use in the negative element of zinc batteries and cells, comprising a mixture of thermally generated zinc particles and particles of electrochemically produced zinc, said particles of electrochemically produced zinc being present in a parts by weight ratio of at least 1:500 relative to said thermally generated zinc.

12 Claims, 1 Drawing Sheet

ENHANCED PERFORMANCE ZINC

The present invention relates to enhanced performance zinc. More particularly, the present invention relates to enhanced performance zinc especially for use in the negative element of primary and secondary zinc cells and batteries, especially in zinc-alkaline systems such as silver-zinc, nickel-zinc, zinc-oxygen, zinc-air and zinc-alkaline-manganese dioxide cells, which incorporate a zinc anode.

In our U.S. Pat. No. 5,206,096 there is described and claimed a slurry for use in mechanically rechargeable metal-air batteries, comprising particulate, porous, zinc-containing material of a particle size within the range of 100–500 microns and having a density within the range of 0.3–1.4 g/cc and a surface area within the range of 0.5–6.0 $m^2/g$, an aqueous solution of at least one Group Ia metal hydroxide, and an inorganic or organic inhibitor ingredient effective to inhibit interaction of said particulate, porous, zinc-containing material and said aqueous solution to prevent evolution of hydrogen gas, wherein the weight ratio in said slurry between said porous zinc-containing material, said aqueous solution and said inorganic inhibitor is 1:0.2–2.0:0.00005–0.04.

In our later U.S. Pat. No. 5,419,987 there is described and claimed an electrochemically prepared zinc powder having an apparent density of about 0.2–2 g/cc and a surface area of about 0.5–6 $m^2/g$ and further having at least one corrosion inhibitor metal intrinsically alloyed therein; said corrosion inhibitor metal selected from a group consisting of antimony, bismuth, cadmium, gallium, indium, lead, tin and mixtures thereof.

The relevant teachings of both of said patents are incorporated herein by reference.

Prior to said patents as far as we were aware, the prior art (Linden, *Handbook of Batteries and Fuel Cells*, p. 10–6; also, *Kirk Othmer Encyclopedia of Chemical Technology*, Vol. 24, p. 205) was based on zinc powders from thermal atomization of molten zinc in an airjet, which produces lower porosity and lower surface area zinc powders (e.g., density 2.5–3.5 g/cc, average surface area 0.02 $m^2/g$) compared with the electrochemically-generated zinc, with the thermal zinc giving substantially lower performance ratings.

The properties of both electrochemically and thermally generated zinc were discussed in said previous patents. For high rate cell discharges, pressed zinc pellets were generally found to be superior to conventional unpressed slurry-type zinc anodes made from thermal zinc. This is ascribed to the superior electrical conductivity of the pressed zinc matrix. The build-up of poorly conductive zinc oxide layers—the discharge product in a zinc anode—is believed to limit performance in loose zinc slurry electrodes compared with pressed zinc anodes. This is especially true during the later stages of discharge.

For certain commercial applications, incorporation of a pressed anode into cells could be inconvenient since it may require changes to an already existing production line. Surprisingly, it has now been found that a mixture of thermal zinc and particles of electrochemically produced zinc can be used to produce anodes with enhanced performance characteristics at high discharge rates. During production, it would be relatively easy to add electrochemical zinc to thermal zinc with currently available standard gelled anode dispensers.

Even more surprisingly, the enhancement of performance (usually an increase of available capacity under a given load for discharges down to a given cut-off voltage) is achievable with relatively low weight percentages of electrochemical zinc to regular thermal zinc. Thus, significant (10–20%) capacity increases in high rate discharges have been found with additions of as little as 1:100 to 1:7 parts by weight of electrochemical zinc, relative to the thermal zinc.

Thus, according to the present invention there is now provided enhanced performance zinc for use in the negative element of zinc batteries and cells, wherein between 0.2 and 50 weight % of said zinc consists of particles of electrochemically produced zinc More particularly, the present invention provides enhanced performance zinc for use in the negative element of zinc batteries and cells comprising a mixture of thermally generated zinc particles and particles of electrochemically produced zinc, said particles of electrochemically produced zinc being present in a parts by weight ratio of at least 1:500 relative to said thermally generated zinc.

In preferred embodiments of the present invention said particles of electrochemically produced zinc are present in a ratio of between about 1:1 and 1:100 relative to said thermally generated zinc.

In especially preferred embodiments of the present invention said particles of electrochemically produced zinc are present in a ratio of between about 1:7 and 1:50 relative to said thermally generated zinc.

Preferably, said particles of electrochemically produced zinc have an average particle size of less than 75 microns, an apparent density of about 0.2–2 g/cc and a surface area of about 0.5–6 $m^2/g$ and most preferred for use in the present invention is particles of electrochemically produced zinc having an apparent density of about 0.5–1 g/cc and a surface area of about 1–2 $m^2/g$.

Since anodes are usually produced in gel form in preferred embodiments of the present invention, said particles are dispersed in a gel.

A possible theoretical basis for the discovery of the present invention might be found in terms of the physical properties of electrochemical zinc and thermal zinc. Electrochemical zinc has a small particle size (less than 150 microns and preferably less than 75 microns), high surface area (typically ~1 $m^2/g$), low apparent density (typically ~0.8 g/cc), and an irregularly surfaced, spiky, dendritic structure. Thermal zinc is coarse with an average particle size of 150–250 microns, low surface area (0.02 $m^2/g$), relatively high apparent density (2.5–3.5 g/cc) and a smooth globular or dumbell-like structure.

Thus, it is believed that the tiny, but voluminous, electrochemical zinc particles act as a conductive extender between the larger thermal zinc particles throughout the loose, usually gelled, anode structure. Even at late stages of discharge, electrochemical zinc still acts as a conductive filler for thermal zinc; because of its irregular spiky dendritic structure it allows for the build-up of a non-continuous insulating zinc oxide discharge product, leaving substantial amounts of the zinc surface free to act as conducting bridges. Thermal zinc when used alone tends to form a zinc oxide envelope around the coarse globular particles; this oxide coating is heavily insulating in the anode bed, reducing performance.

Adding fine zinc to conventional thermal zinc in alkaline cells would not be apparent to, or recommended by, one skilled in the art and would not be expected to improve battery performance, as also demonstrated in Comparative Example 3 hereinafter. Furthermore, it is not expected or obvious that a portion of the thermal zinc in an anode can be replaced by electrochemical zinc to achieve improved performance. Even if one were to postulate that such addition might be effective, one would anticipate a problem in, e.g., replacing 20% thermal zinc with 20% electrochemical zinc, since electrochemical zinc is so much more bulky and would not fit in the small cavity allocated for the zinc anode in small batteries such as AA cells. It was therefore extremely surprising to discover that the replacement of as little as 1 part per 25 of thermal zinc with electrochemical zinc would result in an improvement of about 20%, as demonstrated in Example 2 hereinafter.

Since spiky, irregularly surfaced zinc of small particle size, high surface area and low apparent density might be produced in a process which would not be characterized as electrochemical, the present invention also provides a mixture of thermally generated zinc particles and irregularly surfaced zinc particles, said irregularly surfaced zinc having an average particle size of less than 150 microns and preferably less than 75 microns, an apparent density of about 0.2–2.5 g/cc and a surface area of about 0.02–6 $m^2$/g and being present in said mixture in a ratio of at least 1:500 relative to said thermally generated zinc. Similarly, the findings of the present invention should also be applicable to cases in which the major zinc component is a smooth surface zinc made by a non-thermal method and having an average particle size above 75 microns.

While the invention will now be described in connection with certain preferred embodiments in the following examples and with reference to the attached figure so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

In the drawings: FIG. 1 is a graphic representation of comparative cell discharge of voltage over time.

COMPARATIVE EXAMPLE 1

Commercial Energizer® zinc-alkaline AA size cells were discharged using a 1.8 ohm resistor and a voltage time curve was plotted. Typical results are shown in Curve 1 of FIG. 1, where it can be seen that the cell provides 102 minutes of service to a 0.9 V cut-off and 114 minutes of service to a 0.8 V cut-off. Analysis of these AA cells indicated that the anode zinc content is about 3.7 g. Analysis and SEM photographs confirmed that the zinc powder was of the thermal type, containing relatively smooth droplet-like particles with a coarse particle size (over 50% of particles being in the 150–250 micron range).

EXAMPLE 2

Energizer® zinc-alkaline M size cells were rebuilt using a zinc anode mixture comprised of 3.55 g of the original manufacturer's zinc to which had been added 0.15 g of Electric Fuel's zinc. The Electric Fuel zinc consisted of electrochemically generated dendritic particles with a fine particle size (100% of particles below 75 microns). The total zinc in the anode was maintained at 3.7 g as in Example 1.

The discharge curve on a 1.8 ohm resistor for cells of this type are shown in Curve 2 of FIG. 1, where it is apparent that performance has increased (122 minutes to the 0.9 V cut-off, a 20% increase in capacity, and 135 minutes to the 0.8 V cut-off, an 18% capacity increase).

COMPARATIVE EXAMPLE 3

In order to confirm that the capacity increases of Example 2 were due to the use of particles of electrochemically produced zinc and not simply due to the incorporation of a finer, smaller type of zinc, we prepared an artificially produced fine fraction of thermal zinc having a particle size below 75 microns. Cells with anodes comprised of 3.55 g of regular Energizer® zinc combined with 0.15 g of the finely sieved zinc showed no increased capacity on the 1.8 ohm discharge test when compared with the results of Comparative Example 1.

EXAMPLE 4

Various different ratios of electrochemical zinc were mixed with thermal zinc and evaluated. Reducing electrochemical zinc down to 1 part per 100 parts thermal zinc, or increasing it up to 10 weight parts per 100 parts thermal zinc in the zinc powder mixture in the existing cavity of an Energizer® cell produced results similar to those reported in Example 3. Above 10 weight parts of electrochemical zinc per 100 weight parts thermal zinc there were problems in introducing 3.7 g of the zinc powder mixture into the cells anode cavity because of the lower bulk density of electrochemical zinc (0.8 gr/cc) compared to thermal zinc (3.1 g/cc). However, in cells with a larger anode cavity space which allow an introduction of an increased ratio of weight of parts of electrochemical zinc per parts of thermally generated zinc greater enhancement is achieved.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. Enhanced performance zinc for use in the negative element of zinc batteries and cells, comprising a mixture of thermally generated zinc particles and particles of electrochemically produced zinc, said particles of electrochemically produced zinc being present in a parts by weight ratio of at least 1:500 relative to said thermally generated zinc.

2. Enhanced performance zinc according to claim 1, wherein said particles of electrochemically produced zinc are present in a ratio of between about 1:1 and 1:100 relative to said thermally generated zinc.

3. Enhanced performance zinc according to claim 1, wherein said particles of electrochemically produced zinc are present in a ratio of between about 1:7 and 1:50 relative to said thermally generated zinc.

4. Enhanced performance zinc according to claim 1, wherein said particles of electrochemically produced zinc have an average particle size of less than 75 microns.

5. Enhanced performance zinc according to claim 1, wherein said particles of electrochemically produced zinc have an apparent density of about 0.2–2 g/cc.

6. Enhanced performance zinc according to claim 1, wherein said particles of electrochemically produced zinc have an apparent density of about 0.5–1 g/cc.

7. Enhanced performance zinc according to claim 1, wherein said particles of electrochemically produced zinc have a surface area of about 0.5–6 m$^2$/g.

8. Enhanced performance zinc according to claim 1, wherein said particles of electrochemically produced zinc have a surface area of about 1–2 m$^2$/g.

9. Enhanced performance zinc according to claim 1, wherein said particles are dispersed in a gel.

10. Enhanced performance zinc for use in the negative element of zinc batteries and cells, comprising a mixture of thermally generated zinc particles and irregularly surfaced zinc particles, said irregularly surfaced zinc having an average particle size of less than 150 microns, an apparent density of about 0.2–2.5 g/cc and a surface area of about 0.02–6 m$^2$/g and being present in said mixture in a ratio of at least 1:500 relative to said thermally generated zinc.

11. Enhanced performance zinc for use in the negative element of zinc batteries and cells, wherein between 0.2 and 50 weight % of said zinc consists of particles of electrochemically produced zinc.

12. A battery anode comprising enhanced performance zinc according to claim 1.

* * * * *